(12) United States Patent
Mamata

(10) Patent No.: US 6,831,630 B2
(45) Date of Patent: Dec. 14, 2004

(54) KEY INPUT DEVICE HAVING BRAILLE INPUT FUNCTION

(75) Inventor: Tohru Mamata, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 186 days.

(21) Appl. No.: 10/192,151

(22) Filed: Jul. 11, 2002

(65) Prior Publication Data

US 2003/0011572 A1 Jan. 16, 2003

(30) Foreign Application Priority Data

Jul. 12, 2001 (JP) .......................... 2001-212596

(51) Int. Cl.$^7$ ................................ G09G 5/00
(52) U.S. Cl. .................... 345/168; 341/22; 434/113
(58) Field of Search ................. 345/168, 169; 341/22, 23, 26; 434/113

(56) References Cited

U.S. PATENT DOCUMENTS 4,888,600 A * 12/1989 Anderson et al. ............. 341/24
5,220,323 A * 6/1993 Ito et al. ......................... 341/24
5,555,004 A * 9/1996 Ono et al. .................... 345/161
5,557,269 A * 9/1996 Montane ....................... 341/22
5,627,566 A * 5/1997 Litschel ....................... 345/168
6,538,582 B1 * 3/2003 Lin et al. ....................... 341/22

FOREIGN PATENT DOCUMENTS

| FR | 2812095 | * 1/2002 |
| JP | 402278324 | * 11/1990 |
| JP | 6-119094 | 4/1994 |
| JP | 10-289051 | 10/1998 |

* cited by examiner

Primary Examiner—Regina Liang
(74) Attorney, Agent, or Firm—Finnegan, Henderson, Farabow, Garrett & Dunner, L.L.P.

(57) ABSTRACT

A plane keyboard equipped with a usual key input function and Braille input function is disclosed. The keyboard comprises a key input circuit in the form of a key matrix. In the key matrix, no two predetermined key switches of the keyboard, which are assigned as both Braille input function keys, are connected to any one of scan lines. This key input device is free from occurrence of a ghost key when a Braille input function is realized using, for example, a six-point-input system in which six keys assigned to realize the Braille input function are simultaneously operable.

8 Claims, 3 Drawing Sheets

FIG. 1

| Scan lines \ Return lines | 0 | 1 | 2 | 3 | 4 | 5 | 6 | 7 |
|---|---|---|---|---|---|---|---|---|
| 1 | | | | | | | | |
| 2 | | Conversion (132) | | (29/42) | App | Pause(126) | | Del(76) |
| 3 | | No conversion (13) | ¥(14) | A(31) | Q(17) | | 1(02) | ESC(110) |
| 4 | | W(18) | Z(46) | ↑(83) | Ent(43) | F12(123) | Num(90) | Ins(75) |
| 5 | Spc(61) | ↓(84) | ←(79) | ↓(27) | BkSp(15) | F10(121) | =(13) | F11(122) |
| 6 | | | | | | | Win | Alt(60) |
| 7 | '(41) | No.56(56) | /(55) | /(40) | P(26) | F9(120) | -(12) | O(11) |
| 8 | | | (54) | L(39) | O(25) | F7(118) | 9(10) | F8(119) |
| 9 | M(52) | N(51) | J(37) | K(38) | | 6(07) | U(23) | 7(08) |
| 10 | | B(50) | F(34) | G(35) | T(21) | 4(05) | R(20) | 5(06) |
| 11 | Rshift(57) | | | Lshift(44) | | | | |
| 12 | Kana(133) | | ,(53) | | I(24) | F6(117) | 8(09) | F5(116) |
| 13 | | RCtrl(64) | | D(33) | E(19) | LCtrl(58) | | |
| 14 | | | C(48) | S(32) | | F3(114) | 3(04) | F4(115) |
| 15 | '(01) | | X(47) | Caps(30) | Tab(16) | F2(113) | 2(03) | F1(112) |
| 16 | V(49) | Fn | | | | H(36) | | Y(22) |

FIG. 2

KEY INPUT DEVICE HAVING BRAILLE INPUT FUNCTION

CROSS-REFERENCE TO RELATED APPLICATIONS

This application is based upon and claims the benefit of priority from the prior Japanese Patent Application No. 2001-212596, filed Jul. 12, 2001, the entire contents of which are incorporated herein by reference.

BACKGROUND OF THE INVENTION

1. Field of the Invention

The present invention relates to a key input device for use in, in general, personal computers, and more particularly to a keyboard with a Braille input function.

2. Description of the Related Art

Input devices that enable optically inconvenienced people to execute, by a Braille input operation, an input operation for an information processing apparatus such as a personal computer have been developed so far. As such an input device, a key input device is used in which some of the key switches arranged on a keyboard are assigned as Braille input function keys. A six-point or eight-point input system, in which six or eight keys assigned are simultaneously operated, is well known as a Braille input system.

A key input device having a Braille input function has been proposed in which information input using the Braille input function can be confirmed (see Jpn. Pat. Appln. KOKAI Publication No. 6-119094). Further, a key input system has been proposed which has a function for switching its input mode between a normal input mode for executing a normal character input operation, and a Braille input mode for executing a Braille input operation (see Jpn. Pat. Appln. KOKAI Publication No. 10-289051).

Moreover, a keyboard called a "plain keyboard", which is effective for cost reduction, has been recently developed. In this keyboard, a diode and resistor are not provided for each key switch in a key matrix. In the structure, more than two keys cannot be simultaneously operated. If three or more keys are simultaneously operated, a phenomenon called a "key ghost" occurs.

Referring to FIG. 4, a brief description will be given of the occurrence of the key ghost.

FIG. 4 shows a so-called scan-type keyboard. In the scan type, scan lines 40 are driven in units of lines at low level (L level), and the state of each return line 41 (high or low level) is read, thereby detecting (scanning) the operation (pushing) of each key.

Suppose that keys α, β and γ are simultaneously pushed (are in the ON state). At this time, if the scan lines for keys α and δ are scanned, a so-called current-wraparound occurs, with the result that the key δ is detected to be pushed (operated), although it is not actually pushed. This phenomenon will be called a "ghost".

In summary, where a key input device having a Braille input function is realized using a plane keyboard, if a Braille input operation is executed by simultaneously pushing three or more keys, a ghost key occurs to thereby cause an erroneous input operation.

BRIEF SUMMARY OF THE INVENTION

It is an object of the present invention to provide a key input device capable of realizing both a usual key input operation and a reliable Braille key input operation even if the key input device is realized by a plane keyboard.

According to one aspect of the present invention, there is provided a key input device including facilities to avoid a ghost key operation during a Braille input operation.

The key input device comprises:

a plurality of key switches, predetermined ones of the key switches being assigned as both Braille input function keys and usual input function keys; and a key switch circuit configured as a key matrix including row lines and column lines connected to the key switches, each of the predetermined key switches generating no ghost key when the predetermined key switches are simultaneously operated.

BRIEF DESCRIPTION OF THE SEVERAL VIEWS OF THE DRAWING

FIG. 1 is a view useful in explaining a key matrix configuration employed in a keyboard according to an embodiment of the invention;

FIG. 2 is a view illustrating a key arrangement on the keyboard of the embodiment;

DETAILED DESCRIPTION OF THE INVENTION

An embodiment of the invention will be described with reference to the accompanying drawings.

Figure 2:
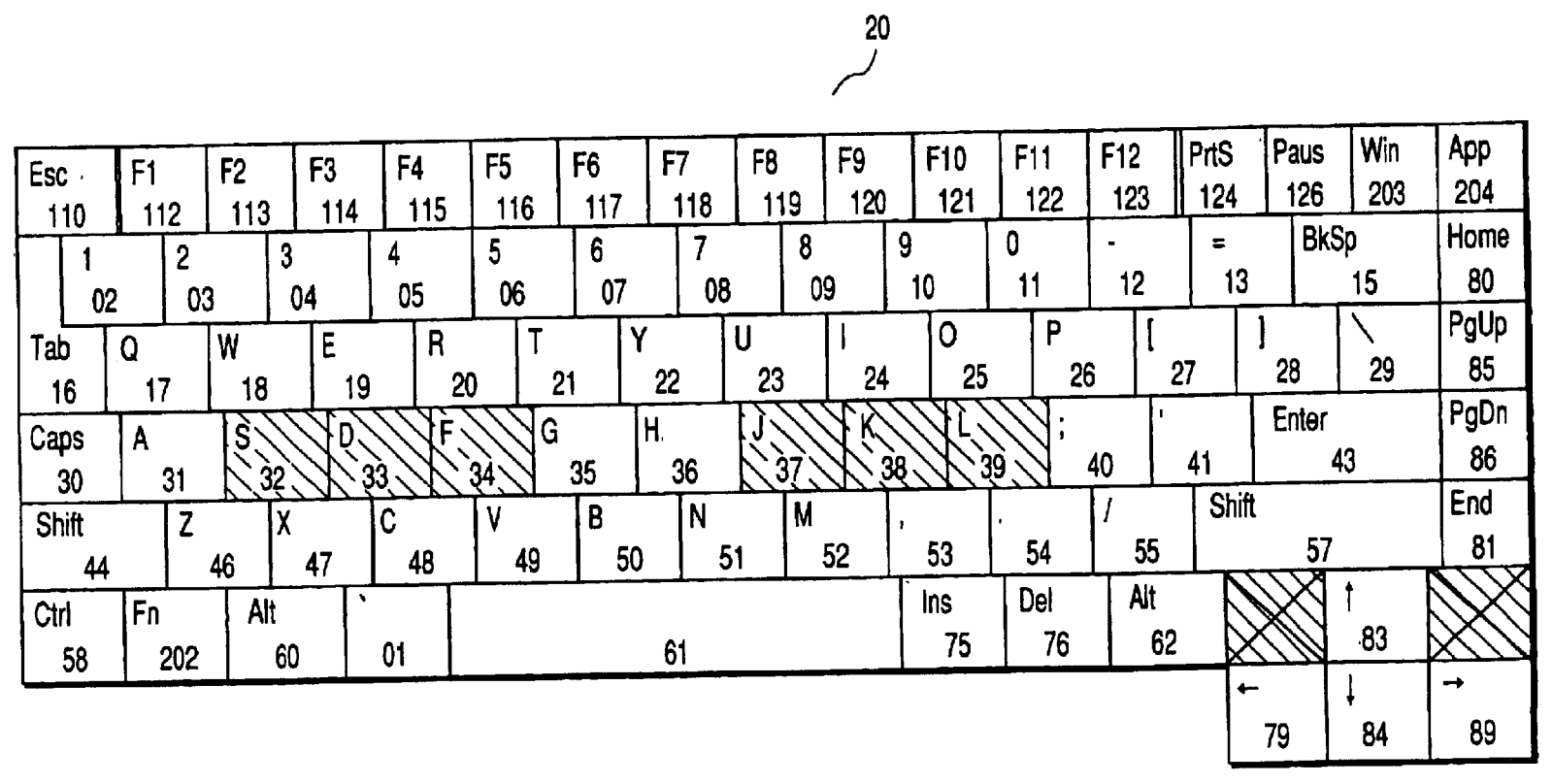

FIG. 1 is a view useful in explaining a key matrix configuration employed in a keyboard according to an embodiment of the invention. Further, FIG. 2 is a view illustrating the actual key arrangement on the keyboard of the embodiment.

(Keyboard Structure)

Figure 3:
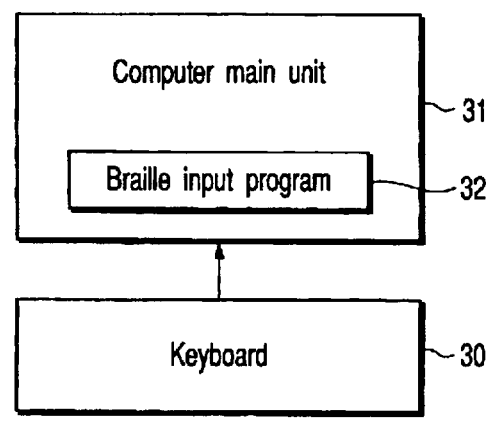
FIG. 3 is a block diagram illustrating a computer system using the keyboard of the embodiment.

As shown in FIG. 3, a keyboard 30 according to the embodiment is used, for example, as a key input device for a personal computer. A computer main unit 31 has a key input control section 32 for receiving a key input operation through the keyboard 30.

The key input control section 32 controls a Braille input operation of, for example, a six-point input system, using a Braille input program. The six-point-input-type Braille input function is a function for permitting a key input operation to be executed by simultaneously pushing the six keys on the keyboard 30 assigned to the Braille input function.

The keyboard 30 is a plane keyboard for executing a scan-type key input operation. In the plane keyboard, in general, a ghost key occurs if three or more keys are simultaneously operated. The condition of occurrence of a ghost key will now be described.

Figure 4:
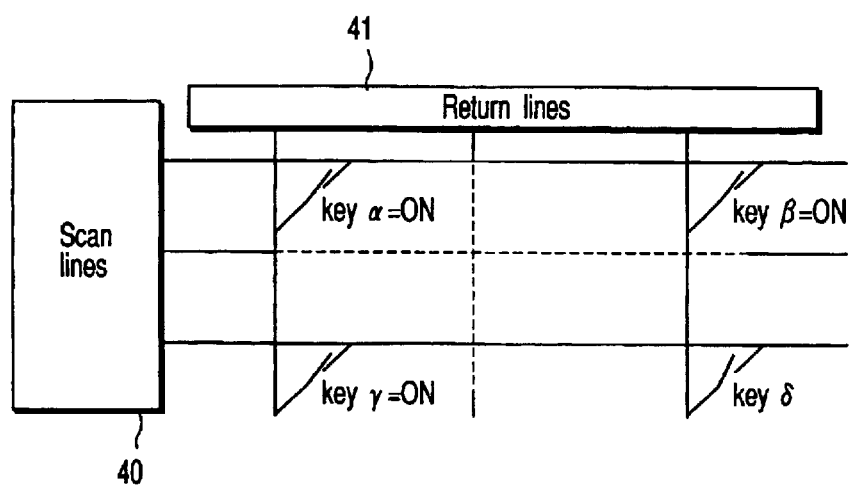
FIG. 4 is a view useful in explaining the occurrence of a ghost key in a conventional plane keyboard.

Suppose that on the same scan line, there are two keys (e.g., keys α and β) pushed simultaneously, and on the same return line as that of the key α, there is another key (e.g., a key γ) pushed simultaneously with the two keys. In this case, the key that exists at the intersection of the return line of the key β and the scan line of the key γ is a ghost key (see FIG. 4).

The keyboard 30 has a key matrix configuration that is free from the condition of occurrence of such a ghost key. Specifically, the keyboard 30 has a key input circuit of the key matrix configuration 10 as shown in FIG. 1. In this key input circuit, the scan lines 11 are driven in units of lines at low level (L level), and the state (low or high level) of each return line 12 is read, thereby detecting the operation (pushing) of each key. The switches on the keyboard have the arrangement 20 shown in FIG. 2.

Suppose in this case that the keyboard 30 employs a six-point-input system that uses, as Braille input function keys, six keys—S key 32, D key 33, F key 34, J key 37, K key 38 and L key 39.

No two of these six keys are arranged on a single scan line 11. In other words, if a user has simultaneously pushed the six keys (if the six keys are simultaneously turned on), the scan line 11 of each of the S key 32, D key 33, F key 34, J key 37, K key 38 and L key 39 does not include any other key simultaneously pushed (see FIG. 1). This does not satisfy the aforementioned condition of occurrence of a ghost key, and hence no ghost key occurs.

As a modification of the embodiment, the six keys—S key 32, D key 33, F key 34, J key 37, K key 38 and L key 39—may be arranged such that no two of them are arranged on a single return line. Also in this case, if the six keys are simultaneously pushed, the return line 12 of each of the S key 32, D key 33, F key 34, J key 37, K key 38 and L key 39 does not include any other key simultaneously pushed. This also does not satisfy the condition of occurrence of a ghost key, and hence no ghost key occurs.

Concerning the Alt key 60, Shift keys 57, 44 and Ctrl keys 64, 58, as well as the six keys, their scan line 11 does not include any other keys, as is shown in FIG. 1.

When the six keys, the S key 32, D key 33, F key 34, J key 37, K key 38 and L key 39, assigned as Braille input function keys on the keyboard 30 of the above-described matrix configuration have been operated, the computer main unit 31 executes a Braille input operation using the Braille input program 32 (see FIG. 3). Even if the six keys are simultaneously operated, no ghost key occurs as aforementioned, and hence an accurate Braille input operation is executed.

Although the embodiment employs the six-point-input system to realize the Braille input function, the invention is also applicable to the eight-point-input system (in which eight keys can be simultaneously operated). In the case of the eight-point-input system, the key matrix configuration is set such that no two of the eight keys assigned as Braille input function keys are arranged on a single scan or return line.

In summary, in the key matrix configuration of the plane keyboard 30 having the above-described Braille input function, the occurrence of a ghost key can be avoided even if three or more keys are simultaneously operated. Accordingly, even if a plurality of predetermined keys assigned to realize the Braille input function are simultaneously pushed, no ghost key occurs and hence a reliable Braille input operation can be executed.

(Modification)

As a modification of the embodiment, a key matrix configuration may be set such that if two or more Braille keys are arranged on a single scan line, no Braille key is arranged on the return line of each of the two or more Braille keys. Alternatively, a key matrix configuration may be set such that if two or more Braille keys are arranged on each of a single scan line and a single return line, no key other than the Braille keys is arranged on each intersection of the lines. Also in this modification, no ghost key occurs and hence a reliable Braille input operation can be executed.

As described above, even in the case of using a plane keyboard, the occurrence of a ghost key can be avoided during a Braille input operation in which a plurality of key switches assigned as Braille input function keys are simultaneously operated. Accordingly, a Braille input function using a six-point-input or eight-point-input system, in which six keys or eight keys assigned as Braille function keys are simultaneously operated, can be realized as well as a usual key input function. As a result, a key input device can be provided which can execute a reliable Braille input operation without any erroneous key input operations.

What is claimed is:

1. A computer system comprising:
    a keyboard including a plurality of key switches, some of the key switches being predetermined key switches assigned as Braille input function keys; and
    a controller configured as a key matrix including row lines and column lines connected to the key switches and configured such that no two of the predetermined key switches assigned as the Braille input function keys are connected to any one of the row lines, each of the predetermined key switches generating no ghost key when the predetermined key switches are simultaneously operated.

2. A computer system according to claim 1, wherein the controller forms the key matrix which realizes a Braille input function of a six-point-input system in which six keys assigned to realize the Braille input function are simultaneously operable.

3. A computer system according to claim 1, wherein the controller forms the key matrix which realizes a Braille input function of an eight-point-input system in which eight keys assigned to realize the Braille input function are simultaneously operable.

4. A computer system comprising:
    a keyboard including a plurality of key switches, some of the key switches being predetermined key switches assigned as Braille input function keys; and
    a controller configured as a key matrix including row lines and column lines connected to the key switches and configured such that no two of the predetermined key switches assigned as the Braille input function keys are connected to any one of the column lines, each of the predetermined key switches generating no ghost key when the predetermined key switches are simultaneously operated.

5. A computer system according to claim 4, wherein the controller forms the key matrix which realizes a Braille input function of a six-point-input system in which six keys assigned to realize the Braille input function are simultaneously operable.

6. A computer system according to claim 4, wherein the controller forms the key matrix which realizes a Braille input function of an eight-point-input system in which eight keys assigned to realize the Braille input function are simultaneously operable.

7. A computer system comprising:
    a keyboard including a plurality of key switches, some of the key switches being predetermined key switches assigned as Braille input function keys; and
    a controller configured as a key matrix including scan lines and return lines connected to the key switches, the scan lines being sequentially driven, each of the predetermined key switches generating a no ghost key when the predetermined key switches are simultaneously operated, and configured such that no two of the predetermined key switches assigned as the Braille input function keys are connected to any one of the scan lines.

8. A computer system according to claim 7, wherein the controller forms the key matrix which realizes a Braille input function of a six-point-input system in which six keys assigned to realize the Braille input function are simultaneously operable.

* * * * *